US009872432B1

(12) United States Patent
Millikan

(10) Patent No.: US 9,872,432 B1
(45) Date of Patent: Jan. 23, 2018

(54) LAWNMOWER ACCESSORY ASSEMBLY

(71) Applicant: Randy G. Millikan, Franklinville, NC (US)

(72) Inventor: Randy G. Millikan, Franklinville, NC (US)

( * ) Notice: Subject to any disclaimer, the term of this patent is extended or adjusted under 35 U.S.C. 154(b) by 74 days.

(21) Appl. No.: 14/946,138

(22) Filed: Nov. 19, 2015

(51) Int. Cl.
*A01D 34/84* (2006.01)
*A01D 34/416* (2006.01)
*A01D 34/76* (2006.01)
*A01D 34/73* (2006.01)

(52) U.S. Cl.
CPC ......... *A01D 34/733* (2013.01); *A01D 34/416* (2013.01); *A01D 34/76* (2013.01); *A01D 34/84* (2013.01)

(58) Field of Classification Search
CPC ....... A01D 34/84; A01D 34/416; A01D 34/76
USPC ........................................................ 56/16.9
See application file for complete search history.

(56) References Cited

U.S. PATENT DOCUMENTS

| | | | | |
|---|---|---|---|---|
| 3,668,845 A * | 6/1972 | Parker | ..................... | A01D 43/16 56/11.6 |
| 4,642,976 A * | 2/1987 | Owens | ................... | A01D 43/16 56/10.7 |
| 4,718,221 A | 1/1988 | Wessel et al. | | |
| 4,896,488 A | 1/1990 | Duncan et al. | | |
| 5,048,276 A | 9/1991 | Miller | | |
| 5,167,108 A * | 12/1992 | Bird | ....................... | A01D 43/16 56/10.4 |
| 5,560,189 A | 10/1996 | Devillier et al. | | |
| 5,966,914 A | 10/1999 | Reents | | |
| 6,343,461 B1 * | 2/2002 | Knott | ..................... | A01D 43/16 56/11.6 |
| 6,381,936 B1 | 5/2002 | Lin | | |
| 6,474,053 B1 | 11/2002 | Lund | | |
| 6,779,325 B1 | 8/2004 | Robillard, II | | |
| 6,892,518 B1 * | 5/2005 | Bares | ..................... | A01D 34/82 56/10.4 |
| 7,549,278 B2 | 6/2009 | McMahan | | |
| 8,046,980 B1 | 11/2011 | Schroeck | | |
| 8,302,372 B1 | 11/2012 | Eubanks | | |
| 8,973,343 B2 * | 3/2015 | Bell | ....................... | A01D 34/66 56/12.7 |
| 9,510,506 B2 * | 12/2016 | Castelli | .............. | A01D 34/4165 |
| 9,560,803 B2 * | 2/2017 | Kobayashi | ............. | A01D 43/16 |

(Continued)

*Primary Examiner* — John Weiss
(74) *Attorney, Agent, or Firm* — Tuggle Duggins P.A.; Blake Hurt

(57) ABSTRACT

A lawnmower accessory assembly includes an extension arm having an inboard end configured for attachment to a lawnmower and an outboard end configured for supporting a trimming assembly operable for cutting or trimming vegetation. The trimming assembly includes a mounting sleeve fixedly mounted on the outboard end of the extension arm, an inner shaft disposed within the mounting sleeve, a rotatable annular pulley secured at one end of the inner shaft and a rotatable trimming disc having at least one trimming member secured at the opposite end of the inner shaft. The pulley of the trimming assembly is operably coupled with a drive pulley provided on the lawnmower by a drive belt such that rotation of the drive pulley in turn rotates the pulley and the trimming disc of the trimming assembly so that the at least one trimming member cuts or trims the vegetation.

12 Claims, 3 Drawing Sheets

(56) References Cited

U.S. PATENT DOCUMENTS

2014/0123614 A1* 5/2014 Hofmeister ............ A01D 34/84
56/12.7

* cited by examiner

US 9,872,432 B1

LAWNMOWER ACCESSORY ASSEMBLY

FIELD OF THE INVENTION

The invention disclosed herein pertains generally to devices, apparatus, systems, assemblies and methods for a lawnmower accessory. More particularly, the invention pertains to a lawnmower accessory assembly configured for attachment to a push mower, power mower, riding mower, lawn and garden tractor or the like, and operable for cutting or trimming vegetation, such as grass, weeds, flowers and small plants.

BACKGROUND AND DESCRIPTION OF THE PRIOR ART

Landowners oftentimes desire to maintain their property by periodically cutting or trimming vegetation, such as grass, weeds, flowers and small plants. In some cases, the use of a push mower or power mower is sufficient to cut or trim the majority of the vegetation on the property. In other cases, the expanse of the property and/or the amount of vegetation justifies the use of a riding mower or a lawn and garden tractor to cut or trim the majority of the vegetation. Regardless, there are typically portions of the vegetation that the push mower, power mower, riding mower or lawn and garden tractor (referred to collectively and generically herein as "lawnmower") are unable to cut or trim. For example, it may not be possible, or at least difficult, for the lawnmower to cut or trim the vegetation around trees and along certain obstacles, such as sidewalks, fences, walls, structures or the like. As a result, it is necessary to cut or trim those portions of the vegetation that the lawnmower is unable to reach with another device, apparatus or the like.

There are different types of devices and apparatus, other than lawnmowers, that are configured for cutting or trimming vegetation. Examples include hand clippers, manually operated trimmers and power trimmers, sometimes referred to as "weed eaters." Unfortunately, such devices and apparatus suffer from notable disadvantages. Hand clippers and manually operated trimmers are slow, cumbersome to use and require a significant expenditure of physical effort. Gas and battery powered trimmers are typically heavy and require periodic refueling and/or recharging. Electrical powered trimmers further require the use of an extension cord that create a safety hazard when used in wet conditions, or when the extension cord is inadvertently cut during operation of the trimmer. The most significant disadvantage of these devices and apparatus, however, is that their use requires a second operation in addition to the operation of the lawnmower. As a result, a significant amount of additional time and/or manpower is needed to complete the job of cutting or trimming the vegetation that cannot be reached using the lawnmower.

In view of the foregoing, it is apparent that a need exists for an improved lawnmower accessory configured for attachment to a lawnmower and operable for cutting or trimming vegetation, such as grass, weeds, flowers and small plants. It is further apparent that there is a particular need for a lawnmower accessory for cutting or trimming vegetation that is convenient and easy to use. A further need exists for a lawnmower accessory for cutting or trimming vegetation that does not require a second operation using a separate device or apparatus in addition to the lawnmower. A still further need exists for a lawnmower accessory for cutting or trimming vegetation that does not require the expenditure of additional time and/or manpower.

In response to the aforementioned disadvantages and needs, the present invention was conceived and has as an objective to provide an improved lawnmower accessory configured for attachment to a lawnmower and operable for cutting or trimming vegetation, such as grass, weeds, flowers, small plants and the like. The present invention has as a further objective to provide a lawnmower accessory for cutting or trimming vegetation that is convenient and easy to use. The present invention has as yet a further objective to provide a lawnmower accessory for cutting or trimming vegetation that does not require a second operation using a separate device or apparatus in addition to the lawnmower. The present invention has a still further objective to provide a lawnmower accessory for cutting or trimming vegetation that does not require the expenditure of additional time and/or manpower.

Various other objectives and advantages of the present invention will become readily apparent to and appreciated by those skilled in the art as a more detailed description of exemplary embodiments of the invention is set forth below.

SUMMARY OF THE INVENTION

The aforementioned objectives and advantages, as well as other objectives and advantages not expressly set forth herein, are realized by providing a lawnmower accessory configured for attachment to a lawnmower and operable for cutting or trimming vegetation that is constructed according to the present invention, as shown and described by the exemplary embodiments disclosed herein.

In one aspect, the present invention is embodied by a lawnmower accessory configured for attachment to a lawnmower and operable for cutting or trimming vegetation. The lawnmower accessory includes an extension arm having an outboard end and an opposite inboard end with the inboard end of the extension arm being attached to the lawnmower. The lawnmower accessory further includes a trimming assembly supported on the outboard end of the extension atm at a predetermined horizontal or lateral distance from the lawnmower. The trimming assembly includes a mounting sleeve fixedly mounted onto the outboard end of the extension arm, an elongate inner shaft having opposite ends and disposed within the mounting sleeve, an annular pulley secured at one end of the inner shaft and an annular trimming disc having at least one elongate trimming member secured at the other end of the inner shaft such that the annular pulley and the trimming disc are rotatable relative to the mounting sleeve and the extension arm. In one embodiment, the annular pulley and the trimming disc are rotated by a drive belt operably coupled with a drive pulley provided on the lawnmower. In another embodiment, the at least one trimming member is selected from the group consisting of a trimming line, string and rod. In another embodiment, the at least one trimming member is serrated, knurled or comprises jagged teeth. In yet another embodiment, the inboard end of the extension arm has a pin, and a corresponding receiver is affixed to the lawnmower and configured to receive the pin therein to attach the extension arm to the lawnmower. In yet another embodiment, the pin is cylindrical and the corresponding receiver is annular. The pin has a through hole and the receiver has at least one pair of corresponding through holes. A fastener engages with the through hole of the pin and the at least one pair of corresponding through holes of the receiver so that the extension arm is attached at a predetermined orientation relative to the lawnmower. In still another embodiment, the outboard end of the extension arm has a mounting collar for fixedly mounting the mounting sleeve of the trimming assembly onto the extension arm. The mounting collar includes a first collar half affixed to the outboard end of the extension arm and an opposite second collar half. The first collar half and the second collar half are secured together by at least one fastener with the mounting sleeve disposed between the first collar half and the second collar half.

In another aspect, the present invention is embodied by a lawnmower accessory assembly including an elongate, substantially rigid extension arm having an inboard end configured for attachment to a lawnmower and an outboard end configured for supporting a trimming assembly operable for cutting or trimming vegetation. The trimming assembly includes a mounting sleeve fixedly mounted to the outboard end of the extension arm, an inner shaft disposed within the mounting sleeve, an annular pulley secured at one end of the inner shaft and an annular trimming disc having at least one trimming member secured at the opposite end of the inner shaft. The annular pulley and the annular trimming disc are rotatable together relative to the mounting sleeve and the extension arm so that the at least one trimming member cuts or trims the vegetation. In one embodiment, the rotatable annular pulley is operably coupled with the lawnmower so that the trimming disc of the trimming assembly and the lawnmower simultaneously cuts or trims the vegetation. In another embodiment, the annular pulley is rotated by a drive belt that is operably coupled to a rotatable drive pulley on the lawnmower. The at least one trimming member is removably secured to the trimming disc. In yet another embodiment, the at least one trimming member is selected from the group consisting of a trimming line, string and rod, and each trimming member is serrated, knurled or has one or more jagged teeth.

In yet another aspect, the present invention is embodied by a method for cutting or trimming vegetation with a lawnmower accessory assembly. The method includes providing the lawnmower accessory assembly with a removable extension arm having an inboard end configured for attachment to a lawnmower and an outboard end configured for supporting a trimming assembly at a predetermined distance from the lawnmower. The trimming assembly includes a rotatable pulley and a trimming disc having at least one trimming member and configured for rotation with the pulley. The method further includes providing a rotatable drive pulley on the lawnmower and operably coupling the pulley of the trimming assembly with the drive pulley of the lawnmower such that rotation of the drive pulley rotates the pulley and the trimming disc of the trimming assembly and the at least one trimming member cuts or trims the vegetation. In one embodiment, the drive pulley of the lawnmower is operably coupled with the lawnmower so that the lawnmower and the lawnmower accessory assembly simultaneously cut or trim the vegetation. In another embodiment, each trimming member is removably secured to the trimming disc, is selected from the group consisting of a trimming line, string and rod, and is serrated, knurled or has one or more jagged teeth.

BRIEF DESCRIPTION OF THE DRAWINGS

The aforementioned aspects, objects, features, advantages and exemplary embodiments of the present invention will be more fully understood and appreciated by those skilled in the art when considered in conjunction with the accompanying drawing figures, in which like reference characters designate the same or similar parts throughout the several views.

DETAILED DESCRIPTION OF EMBODIMENTS OF THE INVENTION

Figure 1:
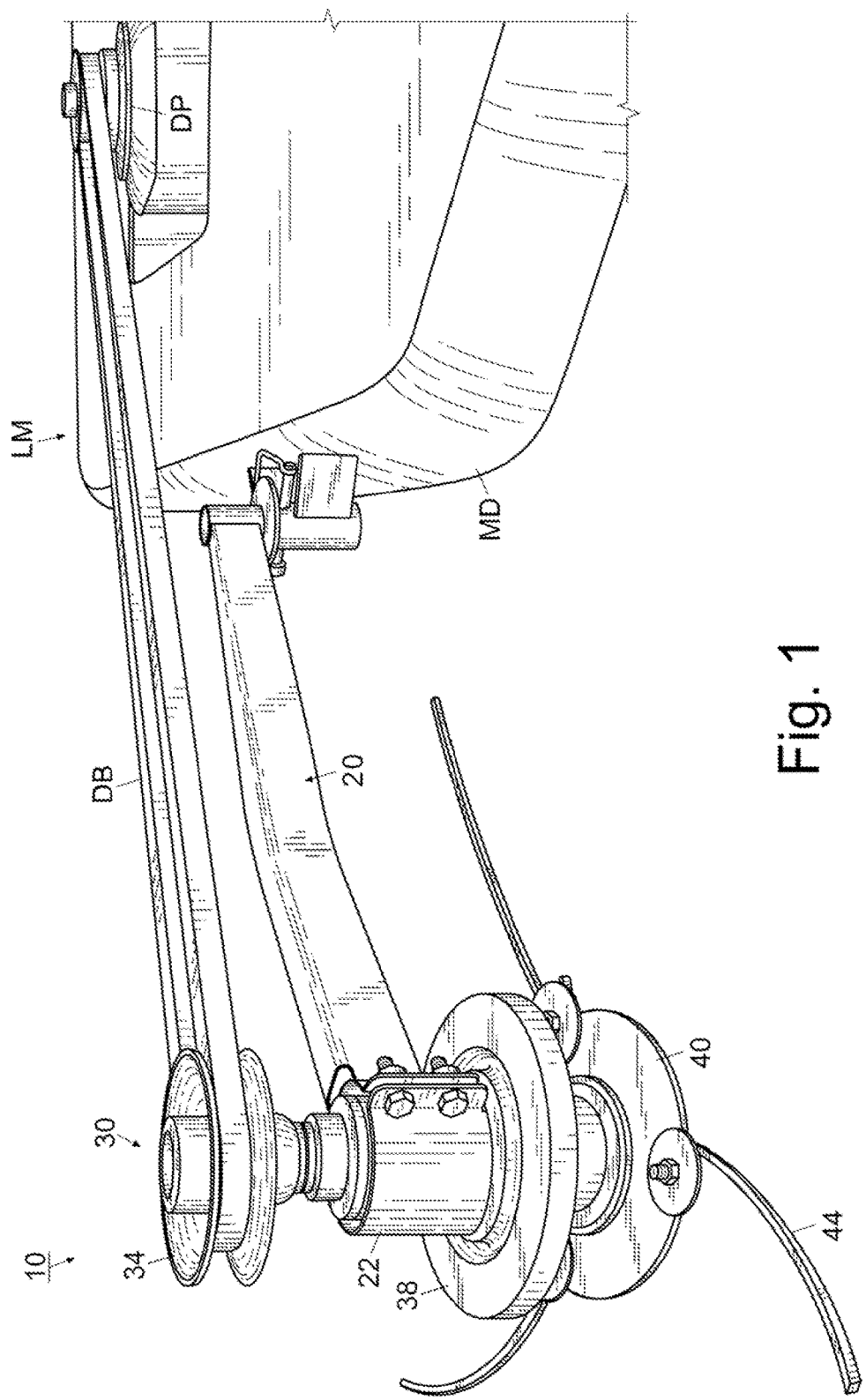
FIG. 1 is an environmental perspective view showing a lawnmower accessory assembly configured for attachment to a lawnmower and operable for cutting or trimming vegetation that is constructed in accordance with an exemplary embodiment of the present invention.

For a better understanding of the present invention and its operation, turning now to the drawings, FIG. 1 shows an exemplary embodiment of a lawnmower accessory assembly, also referred to herein as the "lawnmower accessory," indicated generally by reference character 10, that is constructed in accordance with the present invention. The lawnmower accessory assembly 10 is configured for attachment to a lawnmower, partially shown in FIG. 1 and indicated generally by reference character LM. The lawnmower LM may be any conventional lawnmower, including by way of example but not limitation, a push mower, power mower, riding mower, lawn and garden tractor or the like, suitable for cutting or trimming vegetation, such as grass, weeds, flowers and/or small plants. In the exemplary embodiment depicted in FIG. 1, the lawnmower LM is a conventional riding mower, lawn and garden tractor or the like having a mower deck, indicated generally by reference character MD, and a rotatable drive pulley, indicated generally by reference character DP. The drive pulley DP is mounted on a frame (not shown) of the lawnmower LM and is operable for rotation relative to the frame and the mower deck MD. By way of example only and not limitation, the drive pulley DP may be configured to be rotated by mechanical or electrical power provided by a power take off (PTO) of the lawnmower LM. Regardless, a drive belt DB is attached to the drive pulley DP and to the lawnmower accessory assembly 10 for a purpose to be described hereinafter. It should be understood that drive belt DB may be secured to drive pulley DP when use of lawnmower accessory 10 is desired, but when lawnmower accessory 10 is not in use or lawnmower LM is stored, drive belt DB can be removed from lawnmower accessory 10 and drive pulley DP for the convenience removal of lawnmower accessory 10 from its outboard position on mower deck MD.

In an exemplary embodiment of the invention shown and described herein, lawnmower accessory assembly 10 comprises an elongate, substantially rigid extension arm 20 that depends outwardly from the mower deck MD of the lawnmower LM and supports a trimming assembly 30 at a predetermined horizontal distance from the mower deck MD. An outboard end of the extension arm 20 is configured for supporting and stabilizing the trimming assembly 30 at the predetermined horizontal (i.e. lateral) distance in a generally vertical (i.e. perpendicular) orientation relative to the extension arm. An opposite inboard end of the extension arm 20 is configured for attaching the lawnmower assembly 10 to the mower deck MD, as will be described. The preferred embodiment of extension arm 20 defines a slight angular bend of about ten degrees (10°) proximate the middle of extension arm 20, although such is not a requirement. This bend is not merely a design feature, but rather projects trimming assembly 30 at a more aft position that would otherwise be achieved with a straight extension bar, allowing for better view and more precise control of trimming assembly 30 than would otherwise be possible. Further, the arm curvature is complimentary to the curvature of mower deck MD such that trimming assembly 30 can be stored proximate said deck when not in use.

Figure 2:
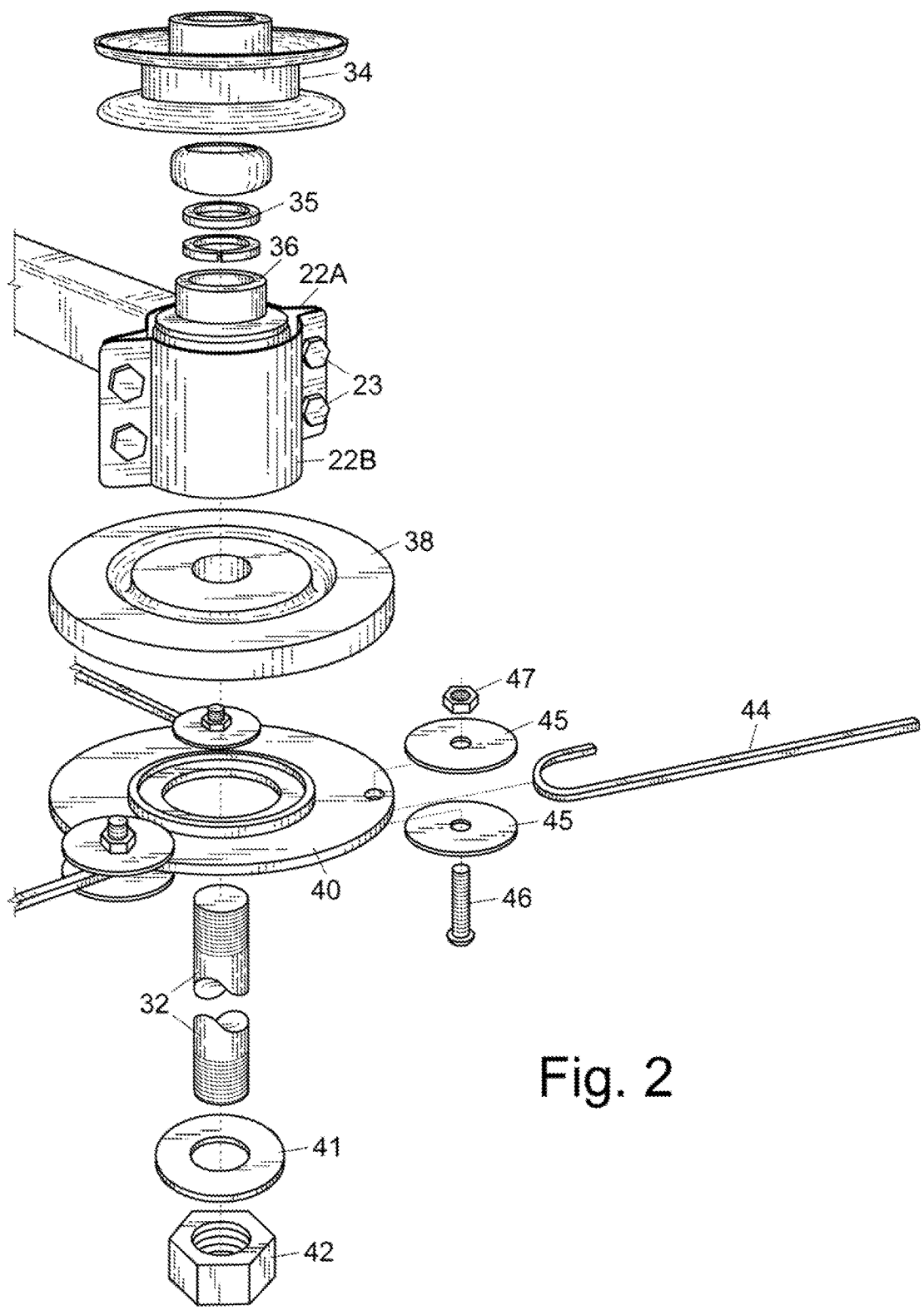
FIG. 2 is an exploded, perspective view of an outboard portion of the lawnmower accessory assembly of FIG. 1.

As best shown in FIG. 2, the outboard end of the extension arm 20 comprises a mounting collar 22 adapted for fixedly mounting the trimming assembly 30 onto the extension arm 20 and supporting the trimming assembly at a predetermined vertical distance (i.e., height) above the ground. As shown herein, the mounting collar 22 comprises a first collar half 22A affixed to the outboard end of the extension arm 20 and an opposite second collar half 22B. The first collar half 22A and the second collar half 22B are secured together by one or more fasteners 23 with a mounting sleeve 36 of the trimming assembly disposed between the collar halves. As would be understood first collar half 22A can be rigidly affixed to extension arm 20 such as be welding, brazing, soldering or the like or can be secured such as by one or more fasteners or the like. As a result, the trimming assembly 30 is held at the predetermined vertical distance above the ground and at the predetermined horizontal distance from the mower deck MD, resulting in a consistent cutting height.

Figure 3:
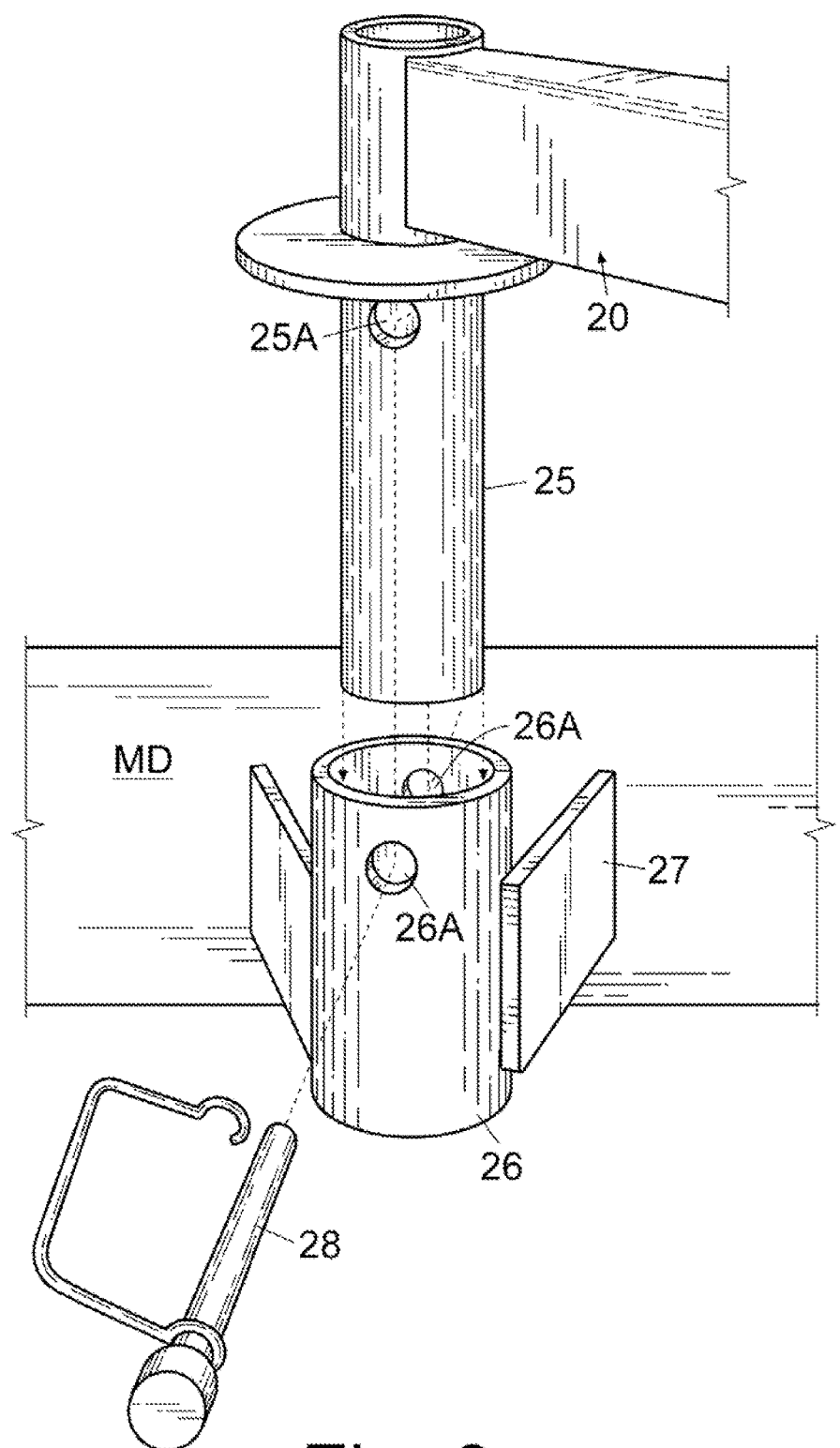
FIG. 3 is an exploded, perspective view of an inboard portion of the lawnmower accessory assembly of FIG. 1.

As best shown in FIG. 3, the inboard end of the extension arm 20 comprises a generally cylindrical shaft or pin 25 rigidly affixed thereto that is configured (i.e., sized and shaped) to be received within an annular, generally cylindrical receiver 26 that is fixedly mounted to the mower deck MD. Receiver 26 may be fixed to the mower deck MD in any suitable manner. For example, the receiver 26 may be welded directly to the mower deck MD. Alternatively, one or more weld plates 27 may be provided for fixedly mounting the receiver 26 to the mower deck MD by welding, brazing, soldering or the like. Regardless, pin 25 has a through opening or hole 25A and receiver 26 has a pair of corresponding through openings or holes 26A. The holes 26A and the hole 25A are configured (i.e., sized and shaped) to receive a locking fastener 28, such as a cotter pin or the like, to secure the cylindrical pin 25 against rotation within the hollow cylindrical receiver 26. As will be readily understood and appreciated by those skilled in the art, if desired, receiver 26 may have a plurality of pairs of corresponding holes 26A so that the extension arm 20 can be positioned at various angular orientations relative to the mower deck MD. Furthermore, the pin 25 and the receiver 26 may have complimentary non-cylindrical geometries, for example square, rectangular, triangular, hexagonal, etc., so that a locking fastener 28 is not necessarily required to prevent rotation of the pin 25 within the receiver 26. Regardless, fixing the position of the pin 25 relative to the receiver 26 in turn fixes the position of the extension arm 20 relative to the mower deck MD.

Referring once again to FIG. 2, trimming assembly 30 comprises an elongate, generally cylindrical inner shaft 32, an annular pulley 34, a generally cylindrical mounting sleeve 36, an optional annular cover plate 38 and an annular trimming disc 40. Each opposite end of the inner shaft 32 is externally threaded for a purpose to be described. The pulley 34 is internally threaded to engage with an externally threaded end of the inner shaft 32 so that the pulley is secured onto one end of the inner shaft 32. Pulley 34 is adapted to receive drive belt DB thereon as seen in FIG. 1 such that rotation of the drive pulley DP of the lawnmower LM in turn rotates the pulley 34 of the trimming assembly 30. As previously mentioned, the mounting sleeve 36 is fixedly mounted to the outboard end of the extension arm 20 by the mounting collar 22. One or more annular washers, rings or the like 35 are disposed between the pulley 34 and the mounting sleeve 36 so that the pulley 34 is rotatable relative to the mounting sleeve 36. If provided, the cover plate 38 is mounted to an underside (i.e., lower end) of the mounting sleeve 36.

In turn, the trimming disc 40 is secured to the opposite externally threaded end of the inner shaft 32, for example by a conventional washer 41 and nut 42. In this manner, rotation of the pulley 34 by the drive belt DB corresponding to rotation of the drive pulley DP of the lawnmower LM results in rotation of the trimming disc 40. Trimming disc 40 is provided with at least one, and preferably a plurality, of elongate trimming members 44, such as trimming lines, strings, rods or the like. Each trimming member 44 is secured to the trimming disc 40 at a desired circumferential location, for example by a pair of opposed washers 45 disposed between an externally threaded fastener 46 and an internally threaded nut 47. If desired, each trimming member 44 may be serrated, knurled, provided with one or more jagged teeth or the like to enhance the cutting or trimming capability of the trimming line. As will be readily understood and appreciated by those skilled in the art, the trimming member(s) 44 may instead be engaged with the trimming disc 40 by means of a quick disconnect mechanism so that the trimming lines may be quickly and easily installed, removed and/or replaced. In addition, the trimming assembly 30 may further comprise a means and/or mechanism for tilting at least the trimming disc 40 so that the trimming member(s) 44 cut or trim the vegetation at an angle, for example between about zero (0) degrees and about ninety (90) degrees relative to the ground. Further, the one or more trimming members 44 may be fixedly or rotatably affixed to trimming disc 40, pen lifting the acceleration of trimming members 44 through the cutting substrate, allowing for a more robust cutting event than may otherwise be possible in view of the limited power provided by lawnmower LM. Various trimming discs are envisioned and should not limited by the embodiments shown or discussed herein.

It will be readily understood and appreciated by those skilled in the art that the present invention also provides a method for simultaneously cutting or trimming vegetation using the lawnmower LM and the trimming assembly 30 of the lawnmower accessory 10 shown and described herein. As a result, cutting or trimming vegetation that the lawnmower LM is unable to reach is convenient, easy and does not require the expenditure of additional time and/or manpower. In an exemplary embodiment of a method according to the present invention, a lawnmower accessory assembly 10 comprising an extension arm 20 and a trimming assembly 30 mounted on an outboard end of the extension arm is provided for a lawnmower LM. The extension arm 20 of the lawnmower accessory assembly 10 is attached to the lawnmower LM such that the trimming assembly 30 positioned at a predetermined horizontal distance from a mower deck MD of the lawnmower. A rotatable drive pulley DP of the lawnmower LM is operably coupled to a rotatable pulley 34 of the trimming assembly 30 by a drive belt DB for rotation therewith. The pulley 34 of the trimming assembly 30 is operably coupled to a rotatable trimming disc 40 for rotation therewith in response to rotation of the drive pulley DP of the lawnmower LM. The trimming disc 40 has at least one trimming member 44 that is positioned at a predetermined vertical distance above the ground and, if desired, at a desired angular orientation relative to the ground. The lawnmower LM is operated so that the vegetation is simultaneously cut or trimmed by the lawnmower and the lawnmower accessory 10.

The foregoing detailed description of exemplary embodiments of the present invention discloses a lawnmower accessory assembly configured for attachment to a lawnmower and operable for cutting or trimming vegetation, for example vegetation that the lawnmower is unable to reach. In a particularly advantageous embodiment, the lawnmower accessory comprises an extension arm for attachment to a mower deck of the lawnmower and a trimming assembly with a rotatable trimming disc having at least one trimming line that is mounted on an outboard end of the extension arm at a predetermined horizontal distance from the mower deck and at a predetermined vertical distance above the ground However, it should be noted and will be readily apparent to, understood and appreciated by those skilled in the art that the drawings, figures, illustrations, examples and embodiments provided herein are for the purpose of providing a complete, accurate and enabling disclosure of the present invention only and are not intended to limit the scope of the following appended claims in any manner. Accordingly, it is envisioned that other structures, mechanisms, configurations and movements may be utilized to accomplish the same or similar functions with the same or similar results without departing from the intended scope of the appended claims.

I claim:

1. A lawnmower accessory configured for attachment to a lawnmower and operable for cutting or trimming vegetation, the lawnmower accessory comprising:

an elongate, angular, substantially rigid extension arm having an outboard end and an opposite inboard end, the outboard end of the extension arm including a mounting collar for fixedly mounting a mounting sleeve of a trimming assembly onto the extension arm, the mounting collar further comprising a first collar half affixed to the outboard end of the extension arm and an opposite second collar half, the first collar half and the second collar half secured together by at least one fastener with the mounting sleeve disposed between the first collar half and the second collar half, the inboard end of the extension arm releasably attached to the lawnmower via a pin defined at the inboard end; and a trimming assembly supported on the outboard end of the extension arm at a predetermined lateral distance from the lawnmower, the trimming assembly comprising a mounting sleeve fixedly mounted onto the outboard end of the extension arm, an elongate inner shaft having opposite ends and disposed within the mounting sleeve, an annular pulley secured at one end of the inner shaft and an annular trimming disc having at least one elongate trimming member secured to the trimming disc at the other end of the inner shaft relative to the annular pulley, the trimming assembly further comprising a shaft nut and shaft washer, one or more collar washers, a pair of trimming washers, a trimming nut, and a trimming threaded fastener;

wherein the annular pulley and the trimming disc are rotatable relative to the mounting sleeve and the extension arm;

wherein a receiver corresponding to the pin is configured to be affixed to the lawnmower and configured to receive the pin therein to attach the extension arm to the lawnmower;

wherein the annular pulley is configured to be rotated by a drive belt operably coupled with a drive pulley provided on a lawnmower;

wherein the inner shaft is externally threaded and the annular pulley is internally threaded;

wherein the one or more collar washers are disposed between the annular pulley and the mounting sleeve;

wherein the shaft washer is disposed between the trimming disc and the shaft nut, the shaft nut rotatably engaged to the externally threaded inner shaft; and wherein the trimming member is disposed between the pair of trimming washers which in turn are positioned respectively between the trimming nut and trimming fastener.

2. The lawnmower accessory according to claim 1, further comprising an optional annular cover plate disposed between the mounting sleeve and the trimming disc.

3. The lawnmower accessory according to claim 1, wherein the at least one trimming member is selected from the group consisting of a trimming line, string and rod.

4. The lawnmower accessory according to claim 3, wherein the at least one trimming member is pivotably secured to the trimming disc.

5. The lawnmower accessory according to claim 1, wherein the pin is cylindrical and the corresponding receiver is annular.

6. The lawnmower accessory according to claim 5, wherein the pin has a pin through hole and the receiver has at least one pair of corresponding through holes, and wherein a fastener engages with the pin through hole and the at least one pair of corresponding through holes of the receiver so that the extension arm is attached at a predetermined orientation relative to the lawnmower.

7. The lawnmower accessory according to claim 1, wherein the angular extension arm defines an angular bend of about ten degrees.

8. The lawnmower accessory according to claim 1, wherein the mounting collar holds the trimming assembly at a consistent predetermined vertical distance above a cutting surface.

9. A lawnmower accessory assembly comprising:

an elongate, angular, substantially rigid extension arm having an inboard end configured for attachment to a lawnmower and an outboard end configured for supporting a trimming assembly operable for cutting or trimming vegetation, the outboard end of the extension arm including a mounting collar for fixedly mounting a mounting sleeve of the trimming assembly onto the extension arm, the mounting collar further comprising a first collar half affixed to the outboard end of the extension arm and an opposite second collar half, the first collar half and the second collar half secured together by at least one fastener with the mounting sleeve disposed between the first collar half and the second collar half, the inboard end of the extension arm defining a downward depending pin configured for insertion within a corresponding receiver positioned on an exterior surface of a lawnmower for releasably attaching the extension arm to the lawnmower;

the trimming assembly comprising a mounting sleeve fixedly mounted to the outboard end of the extension arm, an inner shaft disposed within the mounting sleeve, an annular pulley secured at one end of the inner shaft and an annular trimming disc having at least one trimming member removably secured to the trimming disc at the opposite end of the inner shaft relative to the annular pulley, the trimming assembly further comprising a shaft nut and shaft washer, one or more collar washers, a pair of trimming washers, a trimming nut, and a trimming threaded fastener;

wherein the annular pulley is rotatably and operably coupled with the lawnmower via a drive belt that is operably coupled to a rotatable drive pulley on the lawnmower and the annular pulley and the annular trimming disc are rotatable together relative to the mounting sleeve and the extension arm so that the at least one trimming member of the trimming disc simultaneously cuts or trims the vegetation with the lawnmower;

wherein the inner shaft is externally threaded and the annular pulley is internally threaded;

wherein the one or more collar washers are disposed between the annular pulley and the mounting sleeve;

wherein the shaft washer is disposed between the trimming disc and the shaft nut, the shaft nut rotatably engaged to the externally threaded inner shaft; and wherein the trimming member is disposed between the pair of trimming washers which in turn are positioned respectively between the trimming nut and trimming fastener.

10. The lawnmower accessory assembly according to claim 9, wherein the at least one trimming member is selected from the group consisting of a trimming line, string and rod, and wherein each trimming member is pivotably secured to the trimming disc.

11. The lawnmower accessory assembly according to claim 9, wherein the angular extension arm defines an angular bend of about ten degrees.

12. The lawnmower accessory assembly according to claim 9, wherein the angular extension arm defines an angular bend complementary to a curvature defined by a lawnmower deck, wherein the trimming assembly can be stored proximate said deck when not in use.

* * * * *